(12) United States Patent
Ciotola

(10) Patent No.: US 11,293,488 B1
(45) Date of Patent: Apr. 5, 2022

(54) COMPRESSIVELY RESILIENT BUSHING

(71) Applicant: Alfredo A. Ciotola, Warren, NJ (US)

(72) Inventor: Alfredo A. Ciotola, Warren, NJ (US)

( * ) Notice: Subject to any disclaimer, the term of this patent is extended or adjusted under 35 U.S.C. 154(b) by 0 days.

(21) Appl. No.: 17/367,002

(22) Filed: Jul. 2, 2021

(51) Int. Cl.
*F16C 33/20* (2006.01)
*F16C 17/02* (2006.01)
*F16D 3/68* (2006.01)
*F16D 3/78* (2006.01)
*F16D 3/48* (2006.01)
*F16D 3/60* (2006.01)
*F16D 3/76* (2006.01)
(Continued)

(52) U.S. Cl.
CPC ............ *F16C 33/201* (2013.01); *F16C 17/02* (2013.01); *F16D 3/48* (2013.01); *F16D 3/60* (2013.01); *F16D 3/68* (2013.01); *F16D 3/70* (2013.01); *F16D 3/76* (2013.01); *F16D 3/78* (2013.01); *F16D 2065/1396* (2013.01); *Y10S 16/33* (2013.01); *Y10T 16/05* (2015.01); *Y10T 16/088* (2015.01); *Y10T 403/32721* (2015.01); *Y10T 403/452* (2015.01)

(58) Field of Classification Search
CPC .......... F16C 33/201; F16C 17/02; F16D 3/68; F16D 3/60; F16D 3/78; F16D 3/76; F16D 3/48; F16D 3/70; F16D 2065/1396; Y10T 403/452; Y10T 403/32721; Y10T 16/088; Y10T 16/05; Y10S 16/33
USPC .............................. 464/71, 89, 118; 310/271
See application file for complete search history.

(56) References Cited

U.S. PATENT DOCUMENTS 2,959,437 A * 11/1960 Piragino ................... F16D 3/78
464/71
3,349,649 A * 10/1967 Mele ..................... B23B 49/023
16/2.1
(Continued)

FOREIGN PATENT DOCUMENTS

CN 203332201 U 12/2013
CN 108953378 B 6/2020
(Continued)

OTHER PUBLICATIONS

"Reducing Flexible Bushing," ferguson.com. Accessed: Jan. 28, 2021. https://web.archive.org/web/20210128015152/https://www.ferguson.com/product/fernco-6-1950-X-4-12-in-reducing-flexible-bushing-f63804500r/_/R-7813290.
(Continued)

*Primary Examiner* — Greg Binda
(74) *Attorney, Agent, or Firm* — Roberts & Roberts, LLP

(57) ABSTRACT

A compressively resilient bushing useful for aligning shafts and couplings and adjusting shaft misalignment. They find use as component parts of shaft, and other coupling devices. It comprises a cylindrical sleeve having an outer wall, and a hollow core through. The cylindrical sleeve defines an inner wall of the cylindrical sleeve. The hollow core extends longitudinally from a top to a bottom of the cylindrical sleeve. The cylindrical sleeve comprises a compressively resilient material. Grooves through the outer wall are around a circumference of the cylindrical sleeve. T-shaped grooves through the outer wall extend longitudinally from the top to the bottom of the cylindrical sleeve. Each T-shape groove has a ledge partially overlapping from the top to the bottom of the cylindrical sleeve at opposite sides of. Said T-shape grooves and the ledges extend from the top to the bottom of the cylindrical sleeve.

14 Claims, 4 Drawing Sheets

(51) Int. Cl.
*F16D 3/70* (2006.01)
*F16D 65/02* (2006.01)

(56) References Cited

U.S. PATENT DOCUMENTS

| | | | |
|---|---|---|---|
| 3,601,459 | A | 8/1971 | Cutting |
| 3,966,276 | A | 6/1976 | Bellarbre et al. |
| 4,558,960 | A | 12/1985 | Lehtinen et al. |
| 4,984,776 | A | 1/1991 | Smith |
| 5,460,574 | A | 10/1995 | Hobaugh |
| 5,492,415 | A | 2/1996 | Jordens et al. |
| 5,564,981 | A * | 10/1996 | Iwabuchi ............ F16D 3/68 464/92 |
| 6,325,722 | B1 | 12/2001 | Ciotola |
| 6,379,048 | B1 | 4/2002 | Brissette |
| 7,220,056 | B2 | 5/2007 | Kubota et al. |
| 7,665,747 | B2 | 2/2010 | Arlt |
| 7,695,194 | B2 | 4/2010 | Bouru |
| 8,127,639 | B2 | 3/2012 | Manwaring et al. |
| 8,418,583 | B2 | 4/2013 | Oki et al. |
| 9,279,450 | B2 | 3/2016 | Zaike et al. |
| 9,428,216 | B2 | 8/2016 | Kawakubo |
| 9,744,984 | B2 | 8/2017 | Oda et al. |
| 9,895,779 | B2 * | 2/2018 | Rode ............ B23P 19/084 |
| 9,933,014 | B2 | 4/2018 | Ikeda et al. |
| 10,100,873 | B2 | 10/2018 | Cooper et al. |
| 10,259,488 | B2 | 4/2019 | Bando et al. |
| 10,865,835 | B1 | 12/2020 | Ciotola |
| 2005/0070365 | A1 | 3/2005 | Riefe et al. |
| 2020/0198111 | A1 | 6/2020 | Tynkkynen et al. |
| 2020/0346681 | A1 | 11/2020 | Sekine et al. |

FOREIGN PATENT DOCUMENTS

| | | |
|---|---|---|
| CN | 111271375 A | 6/2020 |
| EP | 0168663 B1 | 11/1989 |
| EP | 1067307 B1 | 12/2003 |
| GB | 1402858 A | 8/1975 |

OTHER PUBLICATIONS

"Taper-Lock Bushing, 2012 Series," grainger.com. Accessed: Jan. 28, 2021. https://web.archive.org/web/20210128003208/https://www.grainger.com/product/GATES-Taper-Lock-Bushing-1NJD7?ppr=APPD&analytics=allitems_45PY02.

"IGUS RJUI-01-08 1/2" DryLin R Polymer Linear Bearing with Shell," globalindustrial.com. Accessed: Jan. 28, 2021. https://web.archive.org/web/20210128013549/https://www.globalindustrial.com/p/motors/linear-bearings-and-guides/linear-bearings/1-2-drylin-r-polymer-linear-bearing-with-shell?infoParam.campaignId=T9F&gclid=CjwKCAiAu8SABhAxEiwAsodSZPfOAbSRSmPnTEOu1eJ8_M37o6VnDO8wjinEPbUr14flKT4-JNzBrxoCMLEQAvD_BwE.

* cited by examiner

COMPRESSIVELY RESILIENT BUSHING

BACKGROUND OF THE INVENTION

Field of the Invention

The present invention relates to a compressively resilient bushing which finds use aligning shafts and couplings. More particularly, the invention relates to a bushing for joining rotatable shafts which adjust shaft misalignment. The bushings find use as component parts of shaft coupling alignment devices such as those shown in U.S. Pat. Nos. 10,865,835 and 6,325,722 whish are incorporated herein by reference.

Description of the Related Art

There is great commercial interest in rotatable shafts which are typically used in motor powered mechanical devices such as pumps and the like. These devices cooperate with a motor via a rotatable shaft which, when rotated along a fixed axis, rotates other machine parts. Because these shafts can only reach limited lengths, they are often connected to one another to form a longer, continuous rotatable shaft. Attempts have been made in the art to compensate for misalignment in rotatable shafts, however rotational vibrations in such shafts and couplings eventually result in an angular distortion and misalignment between the shafts. Shaft axes inevitably exert a lateral force which causes bearings to wear out. This leads to improper shaft rotation, unscheduled outages and costly repairs.

Various attempts have been made to compensate for misalignment between rotatable shafts. Chinese patent CN 111271375A discloses a plain bearing comprising at least three elastic sheets and grooves which are arranged on the outer side wall of an outer ring main body at intervals. The outer contour of each elastic sheet is Y-shaped on the section vertical to the central shaft of the outer ring main body. Great Britain patent GB 1402858A discloses an aerodynamic journal bearing comprising a plurality of arcuate bearing pads mounted in a casing by resilient material which has cavities to facilitate the tilting of each pad about a position offset from the center of its length. The surface of each pad is remote from its bearing surface provided with a pair of recesses which define a tongue about which the pad tends to tilt. Apertures may be provided in the casing into which the resilient material, such as silicone rubber, extends to locate the material. U.S. patent application 2005/0070365 discloses a linear bushing for a telescoping steering column. It comprises a plurality of convolutions disposed axially in side-by-side relationship as viewed in cross-section and extending between the ends of the bushing to provide outer load bearing surfaces to engage the inner surface of the upper jacket. It provides inner load bearing surfaces to engage the outer surface of the lower jacket and to provide radial walls for flexing to maintain the bearing surfaces in engagement with the jackets to allow the bushing to radially expand and contract. Chinese patent CN 203332201U discloses an elastic rack bush which comprises a bush circular ring body. Axial teeth are arranged on the outer wall of the bush circular ring body, two parallel annular grooves are formed in the axial teeth, and annular springs are arranged in the annular grooves. The elastic rack bush can eliminate abnormal sound generated in a gap of a rack and the bush body, and prolong the service life of products. U.S. Pat. No. 9,279,450 discloses a bush bearing for a rack shaft comprising a plurality of axial slits and radial grooves with endless annular-shaped elastic members. U.S. Pat. No. 6,379,048 discloses a resilient, self-aligning bearing cushion having flexing recesses, providing central support for a vehicle driveline.

It has been found that existing bushings have operating limitations which lead to failure conditions. These include torque rating, that is a rubber layer around the bushing gets squashed and causes the bushing and the coupling to fail. Also there is a great degree of misalignment, that is part, of the bushing develops excessive wear on the inside diameter causes the bushing and the coupling to fail. Higher operating temperature develops and a rubber layer practically "cooks" and delaminates off of an insert layer. It would be advantageous to provide a compressively resilient bushing, which for this invention is defined as a bushing having the ability to recover its size and shape after elastic deformation caused by compressive stress.

SUMMARY OF THE INVENTION

The invention provides a bushing which comprises a cylindrical sleeve, said cylindrical sleeve having an outer wall, and a hollow core through said cylindrical sleeve defining an inner wall of the cylindrical sleeve; said hollow core extending longitudinally from a top of the cylindrical sleeve to a bottom of the cylindrical sleeve; said cylindrical sleeve comprising a compressively resilient material; a plurality of grooves through the outer wall extending around a circumference of the cylindrical sleeve; a plurality of T-shaped grooves through the outer wall extending longitudinally from the top of the cylindrical sleeve to the bottom of the cylindrical sleeve; each of said T-shape grooves having a ledge partially overlapping from the top of the cylindrical sleeve to the bottom of the cylindrical sleeve at opposite sides of said T-shape grooves, said ledges extending from the top of the cylindrical sleeve to the bottom of the cylindrical sleeve.

DESCRIPTION OF THE INVENTION

Figure 1:
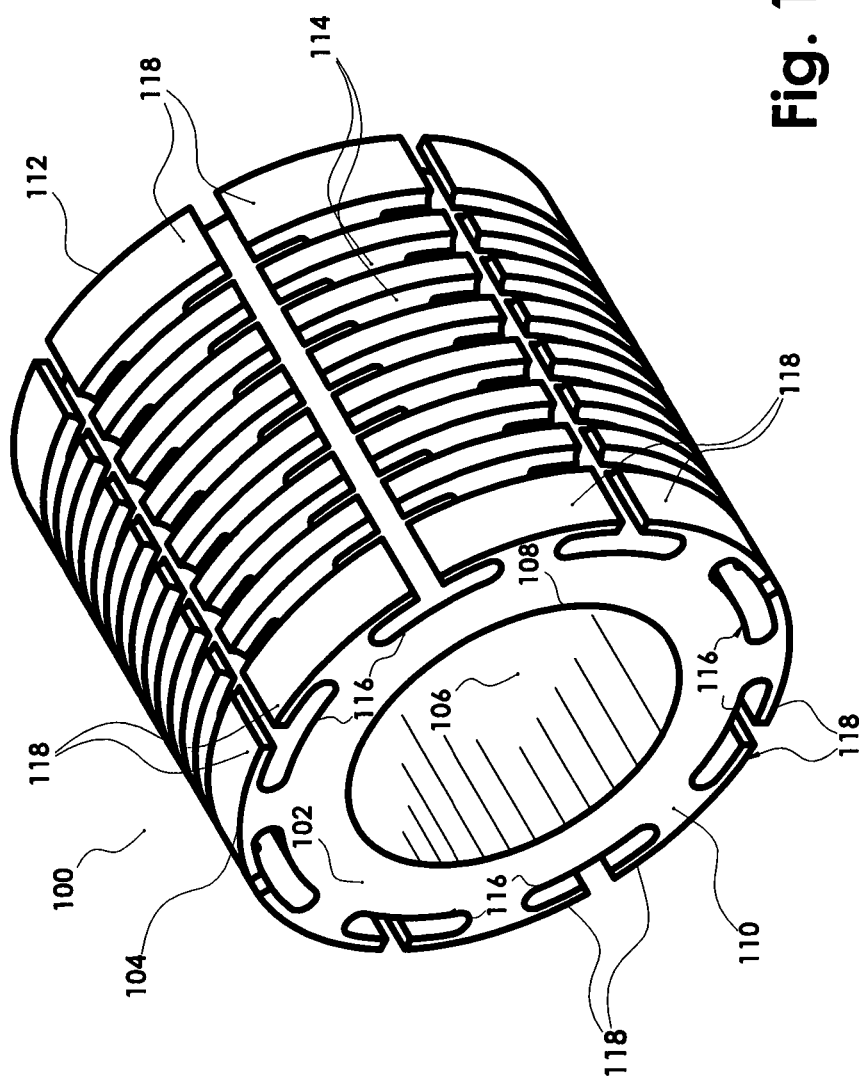
FIG. 1 illustrates a perspective view of a compressively resilient bushing according to the invention.

FIG. 1 shows a perspective view of a compressively resilient bushing 100 according to the invention. The bushing 100 comprises a cylindrical sleeve 102 having an outer wall 104, and a hollow core 106 through said cylindrical sleeve defining an inner wall 108 of the cylindrical sleeve 102. The hollow core 106 extends longitudinally from a top 110 of the cylindrical sleeve 102 to a bottom 112 of the cylindrical sleeve 102. The cylindrical sleeve 102 comprises a compressively resilient material. A plurality of grooves 114 are positioned through the outer wall 104 and extend around a circumference of the cylindrical sleeve 102. A plurality of T-shaped grooves 116 are positioned through the outer wall 104 and extend longitudinally from the top 110 of the cylindrical sleeve 102 to the bottom 112 of the cylindrical sleeve 102. Each of said T-shape grooves 116 has a ledge 118 partially overlapping said T-shape grooves 116 from a top 110 of the cylindrical sleeve 102 to the bottom 112 of the cylindrical sleeve 102 at opposite sides of said T-shape grooves 116. The ledges 118 extend from the top 110 of the cylindrical sleeve 102 to the bottom 112 of the cylindrical sleeve 102. This arrangement affords flexibility and resilience to the overall bushing when in use. In one embodiment, the compressively resilient material of the cylindrical sleeve comprises a polyether ether ketone polymer (PEEK). In a preferred embodiment, the compressively resilient material of the cylindrical sleeve comprises a combination of a polyether ether ketone polymer, graphite, polytetrafluoroethylene and carbon fibers. Other useful compressively resilient materials non-exclusively include at least one of nylon, Torlon (a Solvay Specialty Polymers Trade name for a polyamide-imide plastic), PEEK, Teflon, and Vespel (a Dupont Trade name for a polyimide base plastic), among others. Preferably the compressively resilient material comprises a relatively hard plastic material having a durometer value of from about 75 to about 125 on the A D scale.

In one embodiment, the hollow core 106 has a diameter of from about 0.5 inch to about 6 inches, preferably from about 0.625 inch to about 1.5 inches. In another embodiment, thickness of the cylindrical sleeve 102 from the inner wall 108 to the outer wall 104 is from about 0.125 inch to about 2 inches, preferably from about 0.125 inch to about 2 inch.

In another embodiment of the invention, Grooves 114 and T-shape grooves 116 may optionally be filled with an elastomer or a different rubbery compound such as a silicone rubber to provide added flexibility and resilience, and which stabilizes and supports the ledges 118. The elastomer filling comprises a material different from the compressively resilient material of the cylindrical sleeve. Other useful rubbery compounds non-exclusively include at least one of silicone, Viton (a Dupont Trade name for a fluoropolymer elastomer, and hydrogenated nitrile butadiene rubber, among others. Preferably the elastomer inside the T-shape groves, has a durometer value of from about 30 to about 95 on the A scale.

Figure 2:
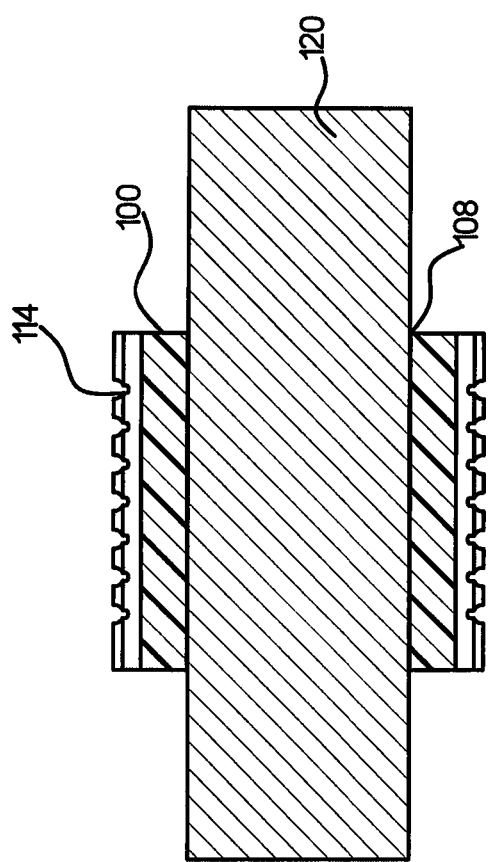
FIG. 2 shows a compressively resilient bushing retaining a central shaft.

FIG. 2 shows a compressively resilient bushing 100 further comprising a shaft 120 within said hollow core, said shaft meeting said cylindrical sleeve at the inner wall 108.

Figure 3:
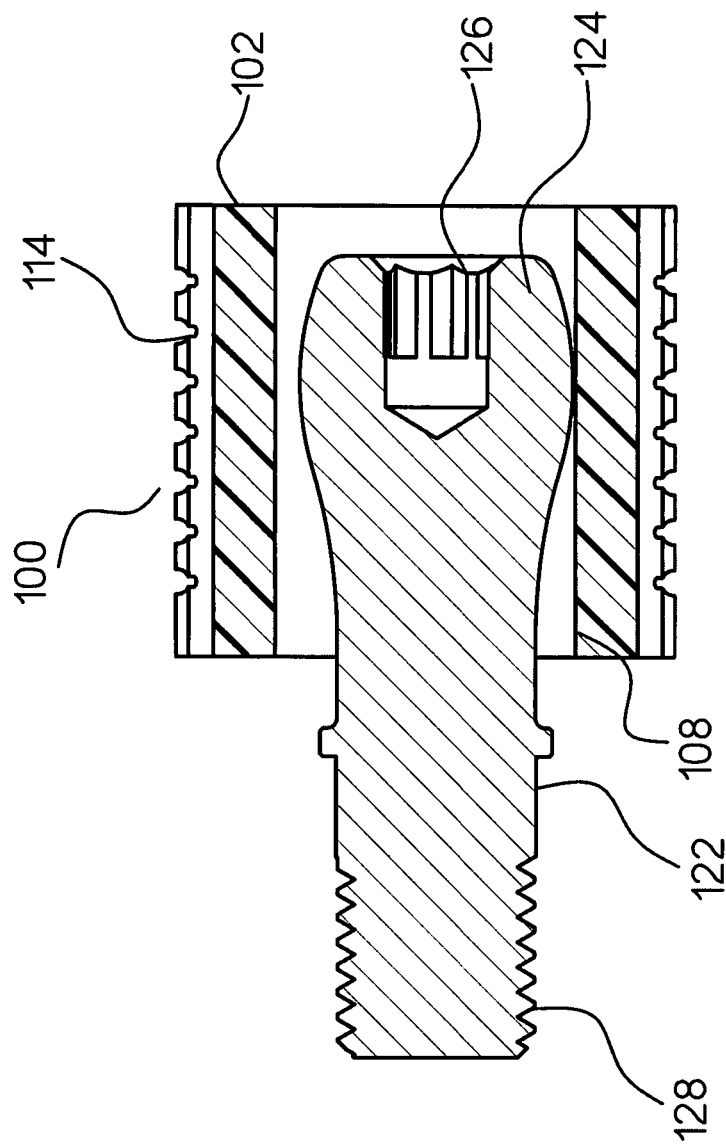
FIG. 3 shows a compressively resilient bushing retaining a bulbous pin.

FIG. 3 shows a compressively resilient bushing further comprising a pin 122 having a bulbous end 124 positioned within said hollow core, said bulbous end 124 of said pin 122 meeting said cylindrical sleeve 102 at the inner wall 108. As shown, the diameter of the bulbous end 124 of pin 122 only touches one of the walls 108 at a time, because the gap is essential in giving the coupling the ability to adjust itself angularly and closing the gap it will make the coupling stiffer. Pin 122 may have a threaded end 128 and a screw end 126 to facilitate attachment of pin 124 to component parts of shaft coupling alignment devices such as those shown in U.S. Pat. Nos. 10,865,835 and 6,325,722. The compressively resilient bushing serves to steady the shaft 122 or pin 122 and lowers vibrations during operation of the coupling alignment devices.

Figure 4:
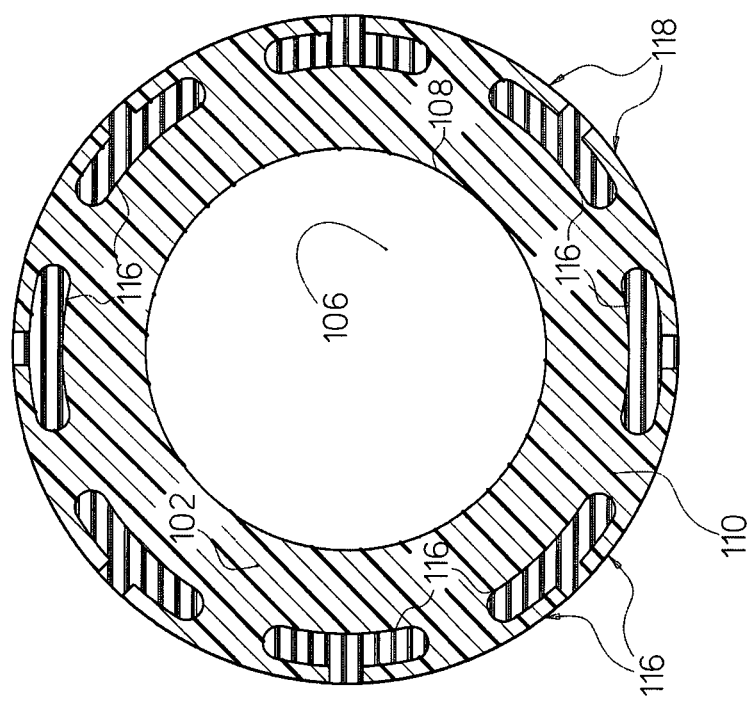
FIG. 4 shows a cross sectional view of a compressively resilient bushing wherein T-shaped grooves are filled with an elastomer.

In a preferred embodiment, the inventive bushing comprises a hard plastic such as PEEK, which has the ability to absorb some shock load, by carving the T-shaped grooves along the length of the outer diameter. When the T-shaped groves are filled with a suitable elastomer that would allow the ledges created by the T-shaped grooves to retain their ability to absorb shock loads and at the same time reduce the possibility of the ledges breaking under load. FIG. 4 shows a cross sectional view of a compressively resilient bushing wherein T-shaped grooves are filled with an elastomer.

The properties of PEEK make it the material of choice for many applications, except for cases where there is a vibratory load in a direction perpendicular to axis of the bushing. In an attempt to over mold a layer of rubber around of the outside diameter of the bushing, vibration is reduced, but since the bushing is not solidly supported, it cracks under load. So, preferable about 40% of the outer diameter of the bushing is solidly supported and the remaining 60% of the outer diameter flexibly supported by the springy ledges. Filling the T-shaped groves with an elastomer to protect the springy ledges and enhance the shock absorbing characteristics of this design is especially desired.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A bushing which comprises
   a cylindrical sleeve, said cylindrical sleeve having an outer wall, and
   a hollow core through said cylindrical sleeve defining an inner wall of the cylindrical sleeve; said hollow core extending longitudinally from a top of the cylindrical sleeve to a bottom of the cylindrical sleeve; said cylindrical sleeve comprising a compressively resilient material;
   a plurality of grooves through the outer wall extending around a circumference of the cylindrical sleeve;
   a plurality of T-shaped grooves through the outer wall extending longitudinally from the top of the cylindrical sleeve to the bottom of the cylindrical sleeve; each of said T-shape grooves having a ledge partially overlapping from the top of the cylindrical sleeve to the bottom of the cylindrical sleeve at opposite sides of said T-shape grooves, said ledges extending from the top of the cylindrical sleeve to the bottom of the cylindrical sleeve; and
   an elastomer filling each of said T-shape grooves from the top of the cylindrical sleeve to the bottom of the cylindrical sleeve; said elastomer filling comprising a material different from the compressively resilient material of the cylindrical sleeve.

2. The bushing of claim 1 wherein the different rubbery compound has a durometer value of from about 30 to about 95 on the A scale.

3. The bushing of claim 1 wherein the different rubbery compound comprises a silicone rubber.

4. The bushing of claim 1 wherein the different rubbery compound comprises at least one of silicone, a fluoropolymer elastomer, and hydrogenated nitrile butadiene rubber.

5. The bushing of claim 1 further comprising a shaft within said hollow core, said shaft meeting said cylindrical sleeve at the inner wall.

6. The bushing of claim 1 further comprising a pin having a bulbous end positioned within said hollow core, said bulbous end of said pin meeting said cylindrical sleeve at the inner wall.

7. The bushing of claim 1 wherein the compressively resilient material of the cylindrical sleeve comprises a polyether ether ketone polymer.

8. The bushing of claim 1 wherein the compressively resilient material of the cylindrical sleeve comprises at least one of a polyether ether ketone polymer, graphite, polytetrafluoroethylene and carbon fibers.

9. The bushing of claim 1 wherein the compressively resilient material of the cylindrical sleeve comprises at least one of nylon, a polyamide-imide plastic, Teflon, and a polyimide base plastic.

10. The bushing of claim 1 wherein the compressively resilient material has a durometer value of from about 75 to about 125 on the D scale.

11. The bushing of claim 1 wherein the hollow core has a diameter of from about 0.5 inch to about 6 inches.

12. The bushing of claim 1 wherein the hollow core has a diameter of from about 0.625 inch to about 1.5 inches.

13. The bushing of claim 1 wherein thickness of the cylindrical sleeve from the inner wall to the outer wall is from about 0.125 inch to about 2 inches.

14. The bushing of claim 1 wherein thickness of the cylindrical sleeve from the inner wall to the outer wall is from about 0.125 inch to about 1 inch.

* * * * *